United States Patent [19]

Maynard, Jr.

[11] Patent Number: 5,717,266

[45] Date of Patent: Feb. 10, 1998

[54] HIGH POWER OSCILLATORY DRIVE

[75] Inventor: Julian D. Maynard, Jr., Boalsburg, Pa.

[73] Assignee: The Penn State Research Foundation, University Park, Pa.

[21] Appl. No.: 610,790

[22] Filed: Mar. 11, 1996

[51] Int. Cl.[6] .......................... H02K 7/06; H02K 49/10; H02K 51/00

[52] U.S. Cl. .......................... 310/103; 310/103; 310/37; 310/39; 310/80; 310/152; 310/16; 310/20; 310/114; 310/268; 74/25; 74/DIG. 4; 464/29

[58] Field of Search .......................... 62/6; 310/103, 310/37, 39, 20, 80, 16, 152, 83, 114, 15, 268; 417/420; 416/3; 464/29; 74/DIG. 4, 25

[56] References Cited

U.S. PATENT DOCUMENTS

| | | | |
|---|---|---|---|
| 2,790,095 | 4/1957 | Peek et al. | 310/103 |
| 2,843,742 | 7/1958 | Cluwen | 250/36 |
| 4,599,551 | 7/1986 | Wheatley et al. | 322/2 |
| 4,686,407 | 8/1987 | Ceperley | 310/323 |
| 4,885,487 | 12/1989 | Ksovreli et al. | 310/36 |
| 4,950,931 | 8/1990 | Goldenberg et al. | 310/36 |
| 5,115,157 | 5/1992 | Blumenau | 310/11 |
| 5,456,082 | 10/1995 | Keolian et al. | 62/6 |

OTHER PUBLICATIONS

Thermoacoustic Engines and Refrigerators, by Gregory W. Swift, pp. 22–28 as appeared in Physics Today, Jul., 1995.

*Primary Examiner*—Thomas M. Dougherty
*Assistant Examiner*—Karl Tamai
*Attorney, Agent, or Firm*—Thomas J. Monahan

[57] ABSTRACT

An oscillatory drive incorporating the invention includes a driven rotor that is mounted on a shaft and includes plural driven permanent magnets disposed thereon. A spring arrangement is coupled to the driven rotor and limits both clock-wise (CW) and counter-clockwise (CCW) rotation thereof. A first driving rotor includes first driving magnets, is mounted for rotation on the shaft and is positioned to a first side of the driven rotor. A second driving rotor includes second driving permanent magnets, is mounted for rotation on the shaft and is positioned to a second side of the driven rotor. The drive mechanism imparts a CW rotation to the first driving rotor and a CCW rotation to the second driving rotor. The first driving permanent magnets coupling to the driven permanent magnets causes a CW rotation of the driven rotor until the spring arrangement terminates the CW rotation and causes a reversal of rotation direction in the CCW direction. The CCW rotation of the second driving rotor and the coupling of its second driving permanent magnets aid the CCW rotation of the driven rotor until that rotation is terminated by the spring arrangement. The reciprocal movement of the driven rotor continues for the duration of energization of the first and second driving rotors.

6 Claims, 5 Drawing Sheets

HIGH POWER OSCILLATORY DRIVE

GOVERNMENT RIGHTS

Development of this invention was supported under U.S. Department of the Navy grant N00014-93-1127. The U.S. Government has license rights under this invention.

FIELD OF THE INVENTION

This invention relates to oscillatory drive mechanisms and, more particularly, to an oscillatory drive mechanism wherein coupling via permanent magnets is a principal active driving force.

BACKGROUND OF THE INVENTION

Oscillatory drives are used in many applications and generally require modest power levels (e.g., less than 1 kilowatt). Some applications, however, require high-power levels and large displacements—on the order of multiple centimeters. Oscillatory drives are employed in thermoacoustic engines and refrigerators wherein acoustic power is used to transfer heat which is utilized in a heat exchange action to provide refrigeration. Whereas typical engines and refrigerators have crankshaft-coupled pistons or rotating turbines, thermoacoustic engines and refrigerators have, at most, a single, flexing, moving part (as in a loudspeaker) with no sliding seals.

High power, large displacement drives for thermoacoustic devices can be made with cranks, cams, unbalanced loads, etc. But such drives are usually limited to relatively low frequencies. This is because, when oscillatory motion is required, acceleration and force are proportional to frequency squared, with the result being that higher frequency actuating oscillations place excessive loads on crank or cam bearings.

High power drives for higher frequencies are typically electro-mechanical "shakers" which employ coils of wire positioned, by compliant suspensions, in high magnetic fields. High power densities are achieved in such "shakers" by establishing a static magnetic field with permanent magnets made from high energy ferromagnetic materials. Such devices are limited by Joule power dissipation of the wire in the moving coils, above which the wire fuses. This problem is particularly restrictive in oscillatory drives because, in such drives, the coils spend much of the time at or nearly at rest. Thus, there is no electromotive force induced back into the coil to limit the power dissipation and heating therein. As a result, high Joule heating can occur in such coils, resulting in failure.

Accordingly, it is an object of this invention to provide an improved oscillatory drive mechanism which avoids the need for moving electro-magnetic coils.

It is another object of this invention to provide an improved oscillatory drive mechanism which enables the achievement of high oscillatory power outputs.

SUMMARY OF THE INVENTION

An oscillatory drive incorporating the invention hereof includes a driven rotor that is mounted on a shaft and includes plural driven permanent magnets disposed thereon. A spring arrangement is coupled to the driven rotor and limits both clock-wise (CW) and counter-clockwise (CCW) rotation thereof. A first driving rotor includes first driving magnets, is mounted for rotation on the shaft and is positioned to a first side of the driven rotor. A second driving rotor includes second driving permanent magnets, is mounted for rotation on the shaft and is positioned to a second side of the driven rotor. The drive mechanism imparts a CW rotation to the first driving rotor and a CCW rotation to the second driving rotor. The first driving permanent magnets coupling to the driven permanent magnets causes a CW rotation of the driven rotor until the spring arrangement terminates the CW rotation and causes a reversal of rotation direction in the CCW direction. The CCW rotation of the second driving rotor and the coupling of its second driving permanent magnets aid the CCW rotation of the driven rotor until that rotation is terminated by the spring arrangement. The reciprocal movement of the driven rotor continues for the duration of energization of the first and second driving rotors.

DETAILED DESCRIPTION OF THE INVENTION

Figure 1:
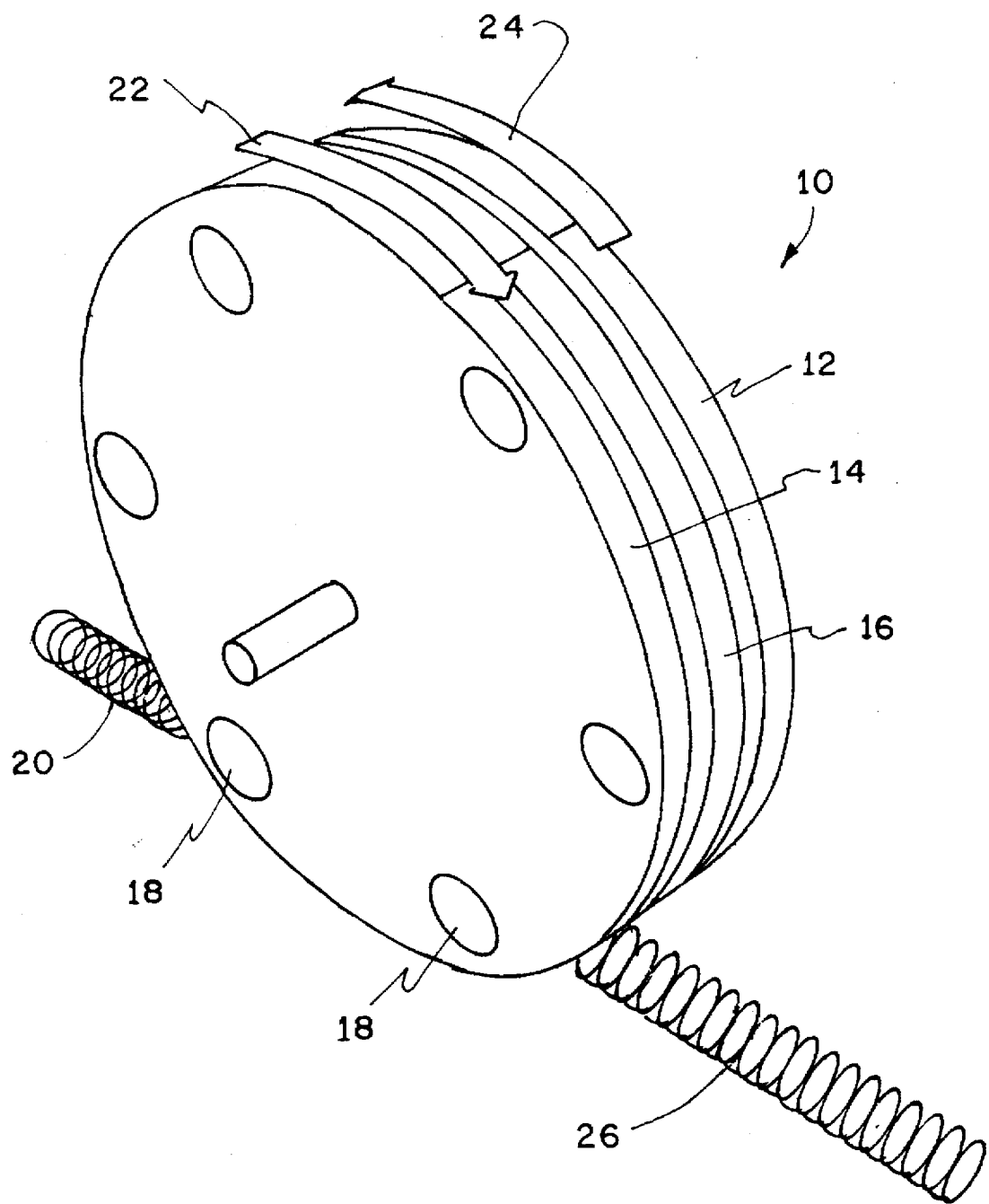
FIG. 1 is a perspective view of an oscillatory drive mechanism incorporating the invention hereof.

Referring now to FIG. 1, oscillatory drive 10 comprises a pair of driving rotors 12 and 14 and a driven rotor 16. Each of driving rotors 12 and 14 and driven rotor 16 include plural, permanent magnets 18, 18' and 18", respectively, disposed about the periphery thereof. A shaft 20 supports each of rotors 12, 14 and 16 and aligns the axes of rotations thereof. Driving rotors 12 and 14 are caused to rotate in opposite directions (as indicated by arrows 22 and 24) via a drive mechanism to be described below. Driven rotor 16, in the embodiment shown in FIG. 1, free-wheels about shaft 20; however, it is coupled to a spring 26 which inhibits both its clockwise and counter-clockwise rotation. As will be hereafter understood, the distal ends of spring 26 are anchored, and the center point thereof is coupled to driven rotor 16.

Figure 2:
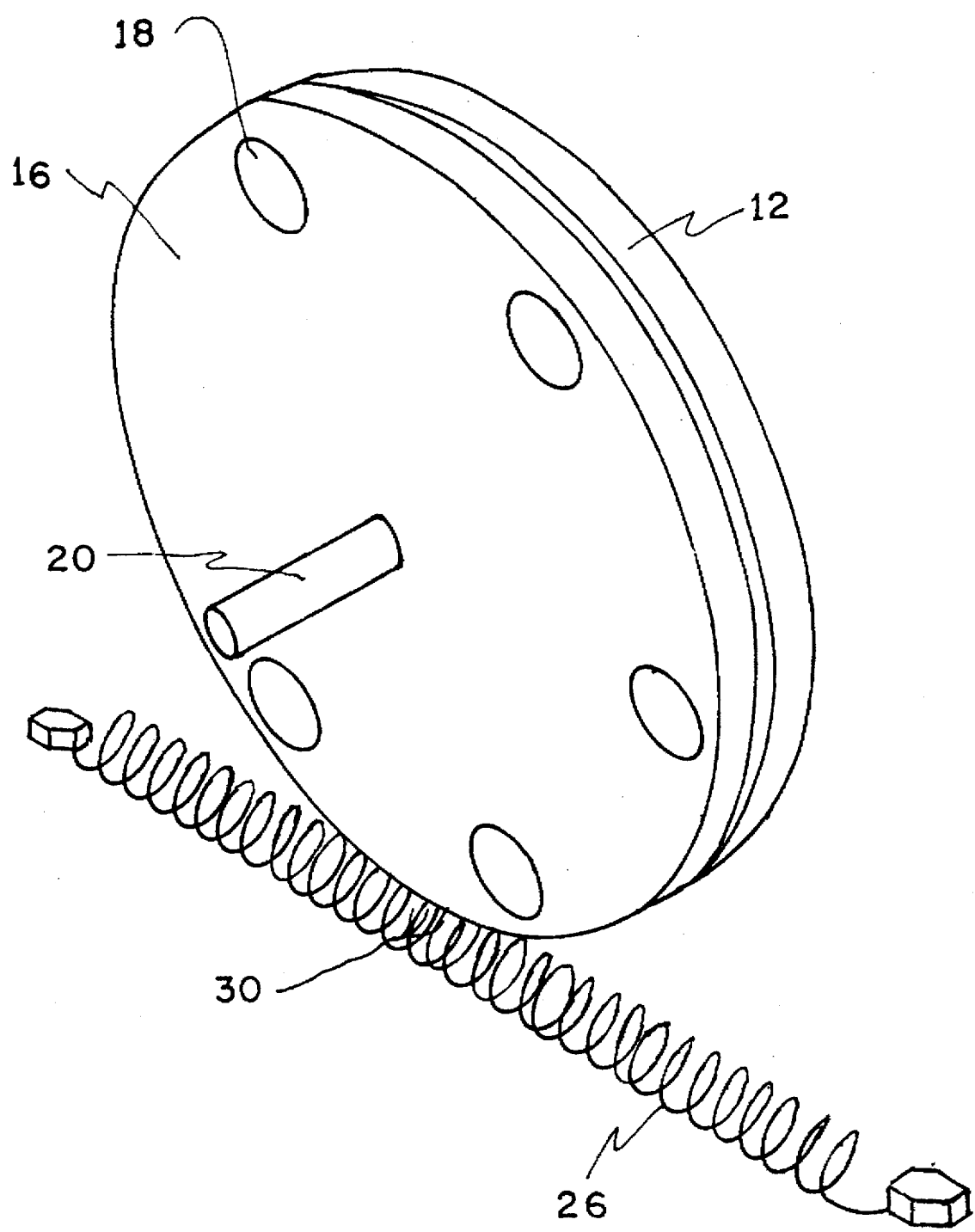
FIG. 2 is a perspective view of the oscillatory drive of FIG. 1, with one driving rotor removed.

In FIG. 2, driving rotor 14 has been removed from shaft 20, thereby exposing the full circumference of driven rotor 16. Magnets 18' that are positioned about the periphery of driven rotor 16 are thereby made visible. A pin 30 extends from driven rotor 16 and is fixedly tied to spring 26. As can be seen from FIG. 2, both ends of spring 26 are fixed to thus limit the oscillatory movement of driven rotor 16.

Figure 3:
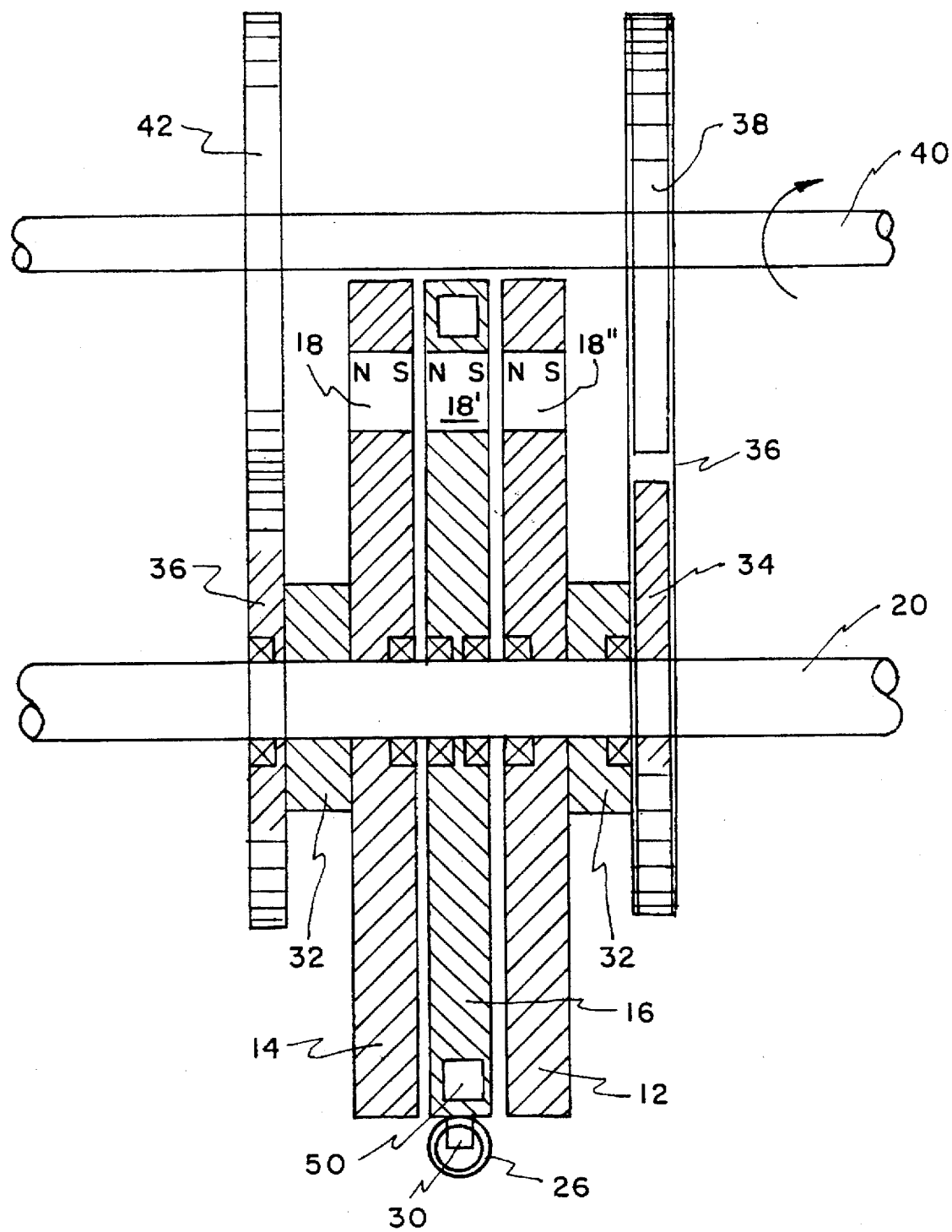
FIG. 3 is a sectional view of the oscillatory drive of FIG. 1.

Referring now to FIG. 3, a sectional view of the oscillatory drive of FIG. 1 is shown and illustrates the various driving mechanisms therefore. Driving rotors 12 and 14 are connected via bushings 32 to gears 34 and 36, respectively. A chain drive couples gear 34 to gear 38 which is, in turn, driven by rotor 40. Also mounted on rotor 40 is gear 42 which is directly coupled to gear 36. When rotor 40 is rotated by a power source (not shown) in a clockwise direction, the action of gear 38, chain drive 36 and gear 34 cause a clockwise rotation of driving rotor 12. The clockwise rotation of shaft 40 is converted by gears 42 and 36 into a driving action which causes driving rotor 14 to rotate in a counter-clockwise manner.

The operation of the oscillatory drive shown in FIGS. 1–3 is dependent upon the interactions of permanent magnets 18, 18', 18" and the restoring force of spring 30 that is exerted upon driven rotor 16. When a rotating magnet 18 or 18" in one of driving rotors 12 or 14 passes a magnet 18' in driven rotor 16, a force is felt in driven rotor 16 which tends to cause driven rotor 16 to follow the influencing magnet. Then, as the driving magnet passes the driven magnet, a force is felt in driven rotor 16 in the opposite direction. In fact, driven rotor 16 (and magnets 18') may follow the driving magnets 18 or 18" for some distance before the restoring influence of spring 26 causes a cessation of the rotation of driven rotor 16 and a reversal of its direction of rotation. At such time, the influence of the opposing direction rotation of magnets on the oppositely directed driving rotor becomes the principal influence upon driven rotor 16. In such manner, driven rotor 16 oscillates back and forth under the influence of driving rotors 12 and 14, controlled by the restoring forces exerted by spring 26. The magnitude of the strengths of permanent magnets 18, 18' and 18", the spacing thereof about the periphery of driving rotors 12 and 14 and driven rotor 16 and the restoring forces exerted by spring 26 all control the amount of displacement of driven rotor 16 during the operation of oscillatory drive 10.

The structure shown in FIGS. 1–3 enables high drive powers because of the high-energy densities available with state-of-the-art permanent magnets. Readily available magnets have energy densities of $2.5 \times 10^5$ Joule/m$^3$. The force between two 10cm. diameter magnets is on the order of 2,000N. If this force is used to drive an oscillator with a 1 cm. displacement amplitude at 60 Hz., then the power delivered is several kilowatts. Larger magnets, multiple sets of magnets, and higher frequencies will increase the available power proportionally and drive powers of many kilowatts are available. Multiple sets of magnets can also be used to increase the frequency of oscillation for a given speed of rotation of driving rotors 12 and 14.

A version of the oscillatory drive shown in FIGS. 1–3 was constructed and tested. The test device used a small cylindrical rare earth cobalt magnets of 2 cm. diameter and a 0.6 cm. thickness, each weighing 15 grams. Because of modest tolerances in the test device, the gap between the magnet disks was relatively large, i.e., 0.2 cm., and the resulting torsional drag between the driving disks was only approximately 70N. At the resonance frequency of the driven disk (30 Hz.), the amplitude of oscillation was 0.5 cm. By measuring the quality factor of the oscillatory drive, using the free decay of the driven rotor, the power delivered was determined to be 33 watts, which was in good agreement with the predicted value.

Figure 4:
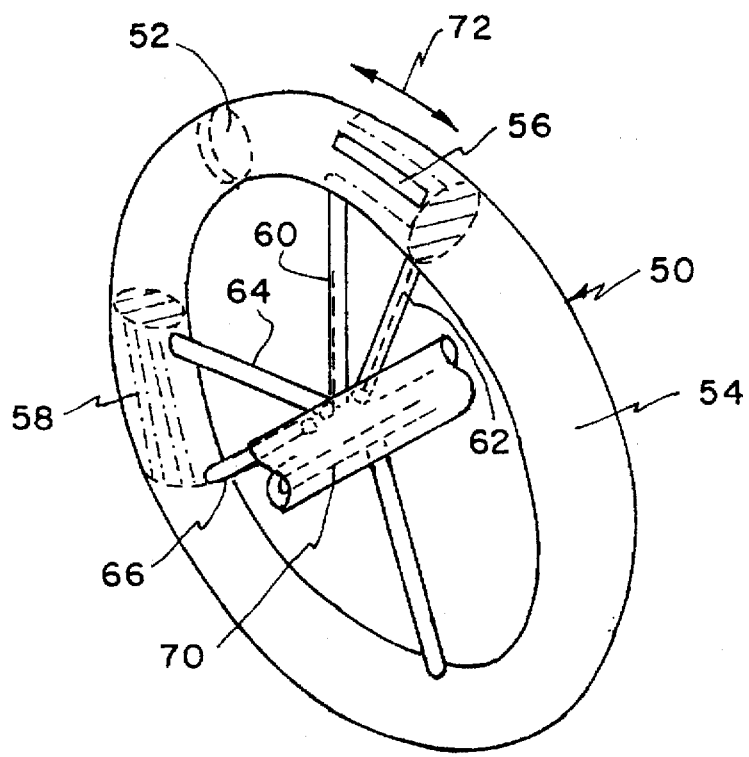
FIG. 4 is a perspective schematic illustrating a thermoacoustic refrigeration unit employing with the invention hereof.
Figure 5:
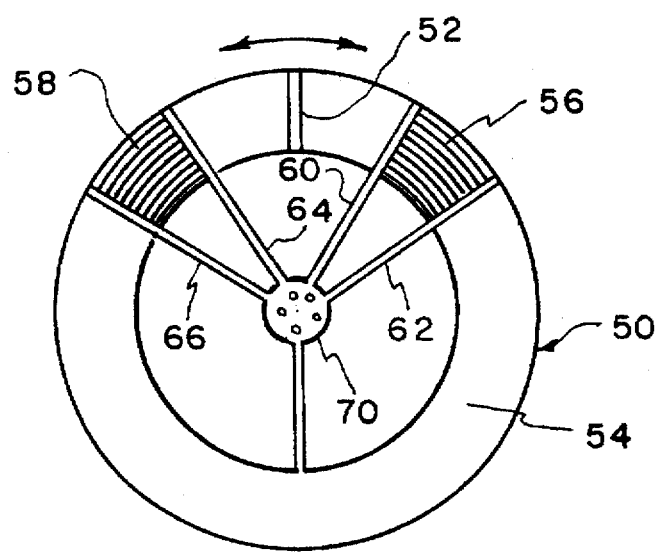
FIG. 5 is a schematic side-view of the thermoacoustic refrigeration unit of FIG. 4.

The oscillatory drive shown in FIGS. 1–3 has direct application to use in a thermoacoustic refrigeration unit. Thus, integral to the periphery of driven rotor 16 is a closed annulus 50 wherein a heat transfer mechanism (thermoacoustic stacks), a thermoacoustic working fluid, and conduits for circulation of the heat exchange fluid are positioned. Referring to FIGS. 4 and 5, a schematic is shown of just annulus 50 and its included components. Within annulus 50 is a barrier 52 which prevents thermoacoustic working fluid 54, present therein, from moving about the periphery of annulus 50. A pair of thermoacoustic stacks 56 and 58 enable thermoacoustic working fluid flow therethrough and further enable a heat exchange fluid to be circulated through their respective ends via conduits 60, 62 and 64, 66, respectively. Each of the aforesaid conduits communicates with a channel within rotor 70 to enable fluid flow both to and from thermoacoustic stacks 56 and 58.

In the embodiment of the oscillatory drive used with the thermoacoustic refrigerator of FIG. 4, driven rotor 16 is rigidly keyed to shaft 70 and conduits 60, 62, 64 and 66 are internal therein. Thus, when driven rotor 16 is caused to oscillate, annulus 50 is also caused to oscillate in the directions shown by arrows 72. Because of the blocking effect of barrier 52, the oscillation of thermoacoustic working fluid 54 causes a heat transfer along thermoacoustic stacks 56 and 58, and the heat is coupled to an external load via conduits 60, 62, 64 and 66.

Figure 6:
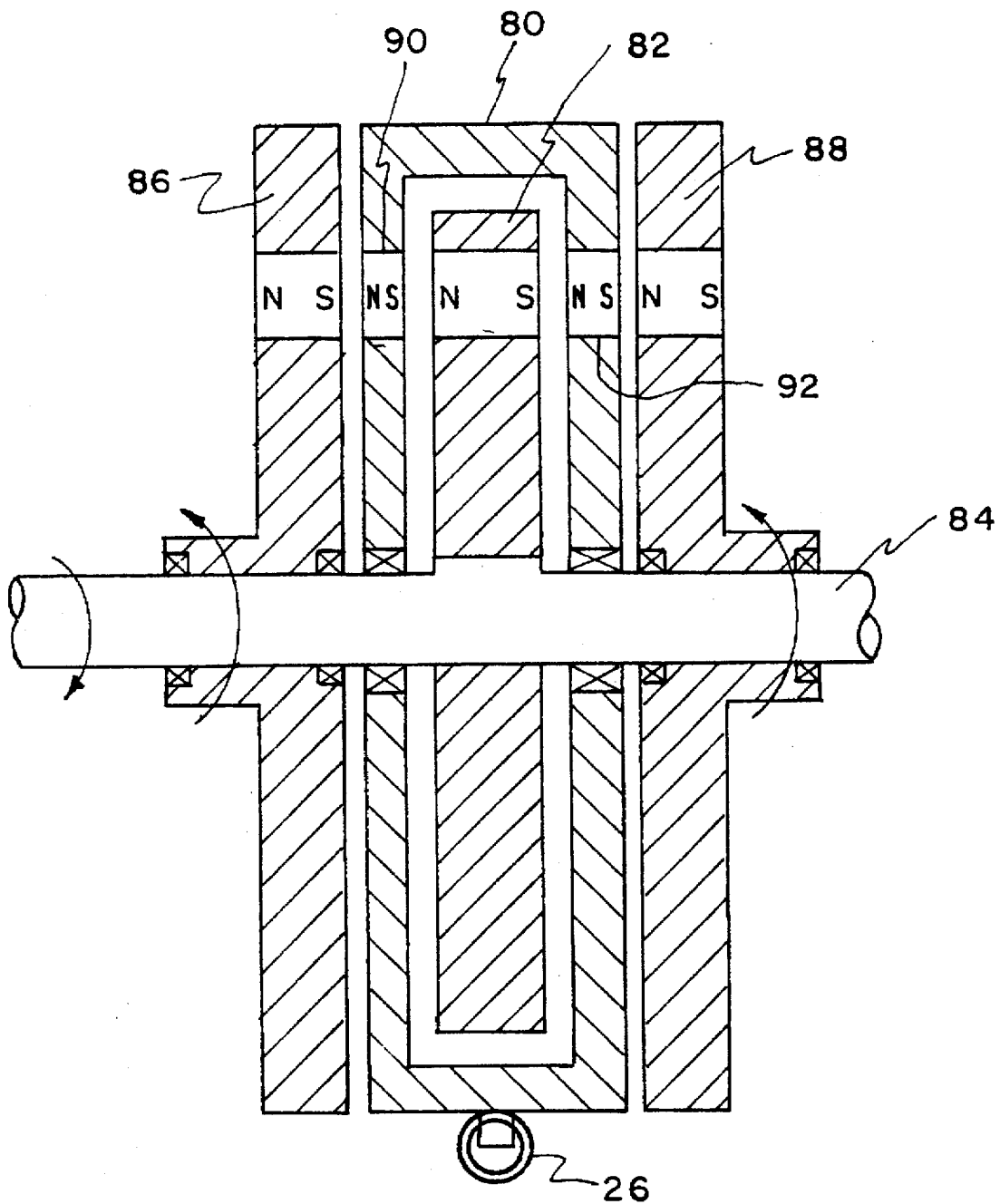
FIG. 6 is a sectional view of a further embodiment of the oscillatory drive hereof.

Referring now to FIG. 6, a further embodiment of the oscillatory drive of the invention is illustrated. In the embodiment illustrated in FIGS. 1–3, the rotating magnets produce an oscillatory torque which is transverse to shaft 20. This affect is eliminated by using a hollow, driven rotor 80 with a driving rotor 82 positioned interiorly therein. Driving rotor 82 is keyed to shaft 84 and is rotated thereby. A further pair of driving rotors 86 and 88 are positioned on either side of driven rotor 80 and are rotated in a common direction by either a chain drive or a gear drive that is common to both (not shown).

This embodiment avoids the problem that is present in FIG. 3 wherein attraction between magnets 18 in driving rotor 14 to magnets 18' in driven rotor 16 cause a pull to the left on rotor 16. In similar manner, attraction between magnet 18" in driving rotor 12 and magnets 18' in driven rotor 16 cause a pull on driven rotor 16 to the right. As a result, driven rotor 16, unless the bearings which mount driven rotor 16 are substantial, will be subjected to a wobble. However, the configuration of FIG. 6 enables magnets 90 and 92 in driven rotor 80 to be surrounded on either side by concentrically located driving magnets, and the structure shown in FIG. 6 has less tendency to wobble.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An oscillating drive comprising:

a shaft;

a driven rotor mounted on said shaft and having plural driven magnet means;

spring means coupled to said driven rotor for limiting both clockwise(CW) and counterclockwise(CCW) rotation thereof;

a first driving rotor means including first driving magnet means, mounted for rotation on said shaft and positioned to a first side of said driven rotor, said first driving magnet means magnetically coupled to said plural driven magnet means;

a second driving rotor means including second driving magnet means, mounted for rotation on said shaft and positioned to a second side of said driven rotor, said second driving magnet means magnetically coupled to said plural driven magnet means;

drive means for imparting a CW rotation to said first driving rotor means and a CCW rotation to said second driving rotor means;

wherein said first driving magnet means is magnetically coupled to said driven magnet means aiding CW rotation of said driven rotor until said spring means terminates said CW rotation and causes commencement of rotation of said driven rotor in a CCW direction, said CCW rotation of said second driving rotor means and magnetic coupling of said second driving magnet means to said driven magnet means aiding CCW rotation of said driven rotor until terminated by said spring means, said first driving rotor means, said second driving rotor means, and said spring thereby causing oscillating rotation of said driven rotor.

2. The oscillatory drive as recited in claim 1, wherein each of said magnet means comprises at least one permanent magnet.

3. The oscillatory drive as recited in claim 1, wherein said plural driven magnet means are mounted at a uniform radius from said shaft, as are said first driving magnet means and second driving magnet means, whereby magnet coupling therebetween is enhanced.

4. The oscillatory drive as recited in claim 1, wherein said driven rotor is hollow, said first driving rotor means is mounted for rotation within said driven rotor and said second rotor means comprises a pair of rotors mounted to either side of said driven rotor and are controlled to rotate in a common direction which is opposed to a direction of rotation of said first driving rotor means.

5. The oscillatory drive as recited in claim 1, further comprising:

output means coupled to said driven rotor, said output means comprising an annular enclosure mounted about said driven rotor and containing a heat transfer fluid, said enclosure further including heat exchange means for extracting heat from said heat transfer fluid which is a result of thermoacoustic heating thereof resulting from said oscillation rotation.

6. An oscillating drive comprising:

a shaft;

a hollow driven rotor mounted on said shaft and having plural driven magnet means;

spring means coupled to said driven rotor for limiting both clockwise(CW) and counterclockwise(CCW) rotation therefor, a first driving rotor means including first driving magnet means, rigidly mounted on said shaft and positioned within said hollow driven rotor, said first driving magnet means magnetically coupled to said plural driven magnet means;

a second driving rotor means including second driving magnet means, mounted for rotation on said shaft and positioned to either side of said driven rotor, said second driving magnet means magnetically coupled to said plural driven magnet means;

drive means for imparting a first rotation direction to said first driving rotor means and a second rotation direction to said second driving rotor means;

wherein said first driving magnet means is coupled to said driven magnet means aiding rotation of said driven rotor in said first rotation direction until said spring means terminates said first direction rotation and causes commencement of rotation of said driven rotor in said second rotation direction, said second direction rotation of said second driving rotor means and magnetic coupling of said second driving magnet means to said driven magnet means aiding rotation of said driven rotor in said second direction until terminated by said spring means, said first driving rotor means, said second driving rotor means, and said spring thereby causing oscillating rotation of said driven rotor.

* * * * *